UNITED STATES PATENT OFFICE.

JAMES HENRY REID, OF NEWARK, NEW JERSEY.

PROCESS OF SECURING WATER-SOLUBLE POTASSIUM COMPOUNDS FROM WATER-INSOLUBLE POTASSIUM-CONTAINING MINERAL.

1,226,812.  Specification of Letters Patent.  Patented May 22, 1917.

No Drawing.  Application filed September 30, 1915. Serial No. 53,303.

*To all whom it may concern:*

Be it known that I, JAMES HENRY REID, a citizen of the United States, residing at 352 Mulberry avenue, in the city of Newark, county of Essex, State of New Jersey, have invented certain new and useful Improvements in Processes of Securing Water-Soluble Potassium Compounds from Water-Insoluble Potassium-Containing Mineral, of which the following is a specification.

This invention relates to the making and separation of soluble potassium compounds from water-insoluble potash bearing minerals, such as the silicious combinations of potassium of compound, composite or complex silicate nature and has for its object the making and securing of soluble potassium compounds from feldspar of the orthoclase or other variety or other potash bearing minerals such as microcline, leucite, muscovite (potash mica), etc., and comprises subjecting the potash bearing mineral to the action of chemical re-agents capable of transforming the potassium content into compounds volatilizable at elevated temperatures such as potassium chlorid and cyanid and subjecting the composition to internal electrical disruption and augmenting the chemical reaction in the production of the desired product by the action of an electric current so disposed and controlled as to produce the desired product and volatilize the same and then after volatilization separating and securing the volatilized potassium compound from the associated gaseous vehicle by the action of electricity of such character as to cause the potassium compounds to be precipitated and separated therefrom.

In carrying out the invention the making and separation of potassium chlorid from orthoclase or potash feldspar will be taken.

Orthoclase, which is a double silicate of potassium and aluminium carrying free silica, is taken and reduced to a fine powdered condition. To this is added calcium chlorid in excess of molecular proportion to react with the potassium silicate content and convert the same when heated into calcium silicate and potassium chlorid. To the orthoclase is added also about 10% of potassium chlorid initially for the purpose of fluxing the material and reducing the volatilizing character of the calcium chlorid.

There is also added to the mixture about 5% of some carbonaceous material such as ground coke for the purpose of initially carrying electricity through the mixture. An electric current is then passed through the mixture of sufficient volume and intensity to transform the silicious potassium compound into chlorid and elevate the temperature to a point at which the potassium chlorid volatilizes. This volatilized potassium chlorid associated with air or other gaseous products passes out from the material being acted upon and is separated by condensing induced or augmented by electricity or what may be termed electro-condensation.

The electro-condensation or precipitation of the volatilized potassium chlorid is accomplished by subjecting the vapor of the volatilized material to the discharge or action of electricity of high tension character whereby the particles of potassium chlorid are caused to rush together and become condensed and precipitated by electrical action, similarly to that which occurs in the electrical precipitation and separation of smoke from products of combustion or fog from the atmosphere.

This operation may be augmented by a current of air preferably pre-heated being caused to circulate in contact with the reactive ingredients which facilitates the volatilization of the potash compound and carrying of the same to a point where it is condensed and collected.

Instead of employing a direct chemically reacting substance capable of transforming the potassium silicate into volatile potassium compound, substances which may co-act to produce the volatile potassium compound may be employed, such as associating feldspar of the potash bearing variety with calcium carbid and passing nitrogen over or through the same in a heated condition whereby potassium cyanid may be produced or yielded and finally secured through volatilization and electro-condensation. In this case it is not necessary to add carbon for the initial passing of electricity through the mixture to overcome resistance as the carbid performs this function itself.

After the current of electricity is passed through the material initially and the material becomes heated the heated product gradually increases in its conductivity so that the operation may be carried on without further augmenting the same by a substance, such as carbon, capable of reducing resistance; after fusion the operation may be carried on by passing a current of electricity therethrough and adding further ingredients to the fused material in proportion not sufficient to cool the same below a point of its superior electrical conductivity and at the time of fusion the different gravities of the carbon added and the associated ingredients is such that the carbon will flow upon the same and form a heat yielding blanket which serves to concentrate the heat within the mixture.

In the production of potassium compounds or salts other water-insoluble minerals or substances containing insoluble potassium compounds than orthoclase may be employed, among which may be mentioned, muscovite or potash mica, leucite, which is a species of feldspar containing less silicon than orthoclase. Also insoluble phosphates, fluo-phosphates, and fluorids, such as amblygonite, triphylite, cryolite, and other compounds containing alkali-metal in an insoluble form can be employed instead of silicates, as materials from which to produce a separate soluble potassium or alkali compounds by the process herein described and are intended to be included and claimed herein as part of the invention.

It is obvious that the proportion of calcium chlorid or other compound employed to dislodge, displace or transform the potassium from its insoluble compound or composition may be varied in accordance with the character of the potassium or alkali-metal compound to be transformed, the potassium or alkali-metal compound produced, and the mineral operated on, also with reference to the amount of potassium or alkali-metal silicate and free silica present, all of which should be ascertained before commencing the operation.

It will be noted that the transformation of potassium in alkali-metal bearing silicate or other mineral is carried on by the action of internal dry heat or by the action of electricity on the materials while in an anhydrous condition and that the separation, delivery and securing of the potassium or alkali-metal compound produced is obtained by volatilizing the product and precipitating the same at a point distant from the point of production and by the action of electro-condensation acting upon the potassium or alkali-metal compound vapor or sublimate *per se* or while suspended and associated with other dry fluids of gaseous or vaporous nature.

By acting on the material through the agency of a current of electricity passed therethrough the material is internally heated uniformly with the exterior and the volatile ingredients evolved, driven out, and discharged therefrom from the interior outward and the conversion or transformation is brought about and carried on more rapidly and perfectly and also the material is more readily evolved and discharged by volatilization than if the material were heated from the outside inward resulting in various zones or spheres of differing temperature from the outside inward the material itself being a non-conductor of heat.

Having now described my invention what I claim is:—

1. The process of securing water-soluble potassium compounds from water-insoluble potassium containing mineral, which comprises exposing the potassium containing mineral, while associated with a chlorid, capable of reacting and forming volatilizable potassium chlorid, to the internal action of an electric current of sufficient volume and intensity passed therethrough to induce re-action, volatilize, and drive out the product.

2. The process of securing water-soluble potassium compounds from potassium silicate containing mineral, which comprises exposing the potassium silicate containing mineral, while associated with a chlorid capable of reacting and forming volatilizable potassium chlorid, to the internal action of an electric current of sufficient volume and intensity passed therethrough to induce re-action, volatilize, and drive out the product.

3. The process of securing water-soluble potassium compounds from feldspar, which comprises exposing the feldspar, while associated with a chlorid capable of reacting and forming volatilizable potassium chlorid, to the internal action of an electric current of sufficient volume and intensity passed therethrough to induce re-action, volatilize, and drive out the product.

4. The process of securing water-soluble potassium compounds from orthoclase, which comprises exposing the orthoclase, while associated with a chlorid capable of reacting and forming volatilizable potassium chlorid, to the internal action of an electric current of sufficient volume and intensity passed therethrough to induce reaction, volatilize, and drive out the product.

5. The process of securing water-soluble potassium chlorid from water-insoluble potassium containing mineral, which comprises exposing the potassium containing mineral, while associated with a calcium chlorid, to the internal action of an electric current of sufficient volume and intensity passed therethrough to induce reaction, volatilize, and drive out the product.

6. The process of securing water-soluble potassium chlorid from potassium silicate containing mineral, which comprises exposing the potassium silicate containing mineral, while associated with a calcium chlorid, to the internal action of an electric current of sufficient volume and intensity passed therethrough to induce reaction, volatilize, and drive out the product.

7. The process of securing water-soluble potassium chlorid from feldspar, which comprises exposing the feldspar, while associated with a calcium chlorid, to the internal action of an electric current of sufficient volume and intensity passed therethrough to induce reaction, volatilize, and drive out the product.

8. The process of securing water-soluble potassium chlorid from orthoclase, which comprises exposing the orthoclase, while associated with a calcium chlorid, to the internal action of an electric current of sufficient volume and intensity passed therethrough to induce reaction, volatilize, and drive out the product.

9. The process of securing water soluble metal compounds from a water insoluble metal compound containing substance, which comprises decomposing the substance by the action of a chemical compound capable of yielding a water soluble product and subjecting the product to the successive action of electricity differing in character of comparatively low voltage and high amperage and high voltage and low amperage whereby the product is successively volatilized and condensed.

10. The process of securing water soluble metal compounds from a water insoluble metal compound containing substance, which comprises transforming the water insoluble substance into the product desired by heating it in the presence of a suitable chemically reacting substance, and volatilizing the product from substances associated therewith and then condensing the same by the successive action of electricity of differing forms varying in character, primarily of low voltage and high amperage and secondarily of high voltage and low amperage, disposed through the product.

In testimony whereof I affix my signature in presence of two witnesses.

JAMES HENRY REID. [L. S.]

Witnesses:
   CHARLES P. SWETT,
   ERNEST H. BALL.